United States Patent
Egawa et al.

(10) Patent No.: US 9,874,741 B2
(45) Date of Patent: Jan. 23, 2018

(54) WAVELENGTH CONVERSION ELEMENT, LIGHT SOURCE DEVICE, AND PROJECTOR

(71) Applicant: SEIKO EPSON CORPORATION, Tokyo (JP)

(72) Inventors: Akira Egawa, Shiojiri (JP); Shigeo Nojima, Azumino (JP); Tetsuo Shimizu, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 31 days.

(21) Appl. No.: 14/854,541

(22) Filed: Sep. 15, 2015

(65) Prior Publication Data

US 2016/0091712 A1 Mar. 31, 2016

(30) Foreign Application Priority Data

Sep. 26, 2014 (JP) ................................ 2014-196411

(51) Int. Cl.
G03B 21/20 (2006.01)
G02B 26/00 (2006.01)

(52) U.S. Cl.
CPC ......... *G02B 26/008* (2013.01); *G03B 21/204* (2013.01)

(58) Field of Classification Search
CPC ........ G03B 21/20; G03B 21/14; G03B 21/16; G02B 26/00; F21S 2/00; F21V 9/10; H04N 5/74
See application file for complete search history.

(56) References Cited

U.S. PATENT DOCUMENTS

| | | | | |
|---|---|---|---|---|
| 2011/0044046 A1* | 2/2011 | Abu-Ageel | ............... | F21K 9/00 362/259 |
| 2011/0228232 A1* | 9/2011 | Sakata | ................... | G02B 7/008 353/31 |
| 2011/0310362 A1* | 12/2011 | Komatsu | .............. | G03B 21/204 353/85 |
| 2012/0200218 A1* | 8/2012 | Maemura | ................ | H01J 29/20 313/483 |
| 2013/0056775 A1 | 3/2013 | Kawakami | | |

FOREIGN PATENT DOCUMENTS

| | | |
|---|---|---|
| JP | 2012-064484 A | 3/2012 |
| JP | 2014-031488 A | 2/2014 |
| WO | 2013/183751 A1 | 12/2013 |
| WO | 2014/024218 A1 | 2/2014 |

OTHER PUBLICATIONS

Feb. 2, 2016 Extended European Search Report for European Patent Application No. 15186912.0.

* cited by examiner

*Primary Examiner* — Sultan Chowdhury
*Assistant Examiner* — Danell L Owens
(74) *Attorney, Agent, or Firm* — Oliff PLC

(57) ABSTRACT

A wavelength conversion element includes a substrate, a reflecting section disposed on one surface side of the substrate, a wavelength conversion layer disposed on an opposite side of the reflecting section to the substrate, and emitting fluorescence in response to irradiation with excitation light, and a reflecting surface disposed between a surface of the wavelength conversion layer on an opposite side to the reflecting section and the reflecting section, and adapted to totally reflect light having been input at an angle no smaller than a critical angle out of the fluorescence.

15 Claims, 8 Drawing Sheets

WAVELENGTH CONVERSION ELEMENT, LIGHT SOURCE DEVICE, AND PROJECTOR

BACKGROUND

1. Technical Field

The present invention relates to a wavelength conversion element, a light source device, and a projector.

2. Related Art

In the past, there has been known a light source device irradiating a phosphor layer with excitation light emitted from a light source such as a laser to use the light emitted from the phosphor layer as illumination light. Further, in order to meet a need for increase in luminance in projectors, there has been proposed a projector provided with such a light source device (see, e.g., JP-A-2012-64484 (Document 1)).

The light source device described in Document 1 has a configuration in which phosphor ceramics is bonded to a light reflective substrate with a bonding material such as resin. The fluorescence generated by the phosphor is reflected by the light reflective substrate after passing through the bonding material, and is then emitted to the outside from the same surface as the surface the excitation enters.

However, every time the fluorescence is reflected by the light reflective substrate, a part of the fluorescence is converted into heat to thereby be absorbed. In other words, a loss of the fluorescence occurs. Therefore, there is a problem that the fluorescence generated by the phosphor cannot efficiently be used.

An advantage of some aspects of the invention is to provide a wavelength conversion element, a light source device, and a projector that are capable of efficiently use the fluorescence generated by the phosphor.

A wavelength conversion element according to an aspect of the invention includes a substrate, a reflecting section disposed on one surface side of the substrate, a wavelength conversion layer disposed on an opposite side of the reflecting section to the substrate, and emitting fluorescence in response to irradiation with excitation light, and a reflecting surface disposed between a surface of the wavelength conversion layer on an opposite side to the reflecting section and the reflecting section, and adapted to totally reflect light having been input at an angle no smaller than a critical angle out of the fluorescence.

According to the wavelength conversion element of this aspect of the invention, the light having entered the reflecting surface at an incident angle equal to or larger than a critical angle out of the fluorescence generated in the wavelength conversion layer is totally reflected by the reflecting surface. Therefore, compared to the case in which the reflecting surface is not provided, an amount of the fluorescence entering the reflecting section is small. In other words, the light loss due to the reflecting layer is low. Therefore, the use efficiency of the fluorescence generated by the wavelength conversion layer is high.

The wavelength conversion element according to the aspect of the invention may further include an intermediate layer disposed between the wavelength conversion layer and the reflecting section, and having a refractive index lower than a refractive index of the wavelength conversion layer is further included, wherein an interface between the wavelength conversion layer and the intermediate layer corresponds to the reflecting surface.

According to the aspect of the invention with this configuration, by disposing the intermediate layer having the refractive index lower than the refractive index of the wavelength conversion layer, the interface between the wavelength conversion layer and the intermediate layer can be used as the reflecting surface.

In the wavelength conversion element according to the aspect of the invention, the intermediate layer may have a thickness no smaller than a wavelength of the fluorescence.

According to this configuration, since a large proportion of the fluorescence is reflected by the reflecting surface, only little fluorescence enters the reflecting section. Thus, since an amount of the light absorbed by the reflecting section is small, the use efficiency of the fluorescence generated by the wavelength conversion layer is high.

In the wavelength conversion element according to the aspect of the invention, the thickness of the intermediate layer may be no smaller than 1 μm.

According to this configuration, since a large proportion of the fluorescence is reflected by the reflecting surface, only little fluorescence enters the reflecting section. Thus, since an amount of the light absorbed by the reflecting section is small, the use efficiency of the fluorescence generated by the wavelength conversion layer is high.

In the wavelength conversion element according to the aspect of the invention, the intermediate layer may be formed of an adhesive.

According to the aspect of the invention with this configuration, the bonding layer for bonding the wavelength conversion layer and the reflecting layer to each other can be used as the intermediate layer.

In the wavelength conversion element according to the aspect of the invention, thermal conductivity of the intermediate layer may be higher than thermal conductivity of the wavelength conversion layer.

According to the aspect of the invention with this configuration, the heat radiation performance of the intermediate layer is enhanced, and thus, the rise in temperature of the wavelength conversion layer can be suppressed.

In the wavelength conversion element according to the aspect of the invention, the reflecting surface may have an uneven shape.

According to this configuration, it is possible to provide a scattering property to the light reflected by the reflecting surface. Thus, it is possible to increase the proportion of the light, which can be emitted to an external space without being totally reflected by an interface between the light exit surface of the wavelength conversion element and the external space (air), out of the light having been reflected by the reflecting surface and then entered the interface.

In the aspect of the invention, the reflecting surface may be an interface between a void and a material located in a periphery of the void.

According to the aspect of the invention with this configuration, it is possible to make efficient use of the voids mixed or generated in the manufacturing process.

In the aspect of the invention, the wavelength conversion layer may include one of a plurality of crystal faults and a plurality of crystal grain boundaries, and the reflecting surface is formed of one of the crystal fault and the crystal grain boundary.

According to the aspect of the invention with this configuration, it is possible to make efficient use of the crystal faults and the crystal grain boundaries generated in the manufacturing process as the reflecting surface.

In the wavelength conversion element according to the aspect of the invention, the reflecting section may be a dichroic mirror adapted to transmit the excitation light and reflect the fluorescence.

According to this configuration, a transmissive wavelength conversion element can be provided. For example, in the case of adopting the configuration in which the excitation light is applied from another surface side on the opposite side of the one surface of the substrate, on which the dichroic mirror and the wavelength conversion layer are disposed, the excitation light is transmitted through the dichroic mirror, and then enters the wavelength conversion layer. It results that the light, which has proceeded toward the dichroic mirror, and then has been transmitted through the reflecting surface, out of the fluorescence emitted in response of the irradiation with the excitation light is reflected by the dichroic mirror.

In the wavelength conversion element according to the aspect of the invention, the wavelength conversion layer may include a plurality of materials different in refractive index from each other.

According to the aspect of the invention with this configuration, even in the case in which the wavelength conversion layer is formed of the plurality of materials different in refractive index from each other, by disposing the intermediate layer having the refractive index lower than the refractive indexes of these materials, it is possible to totally reflect the light at an incident angle equal to or larger than a critical angle out of the light emitted from the wavelength conversion layer with efficiency.

In the wavelength conversion element according to the aspect of the invention, the substrate may be rotatable around a rotational axis intersecting with the one surface of the substrate.

According to the aspect of the invention with this configuration, since the area of the wavelength conversion layer irradiated with the excitation light can temporally be moved, the temperature can be prevented from locally rising. Thus, the deterioration of the wavelength conversion layer can be prevented.

A light source device according to another aspect of the invention includes a light emitting element adapted to emit excitation light, and the wavelength conversion element described above.

According to this aspect of the invention, since the wavelength conversion element superior in use efficiency of the fluorescence is provided, the light source device capable of high luminance light emission can be provided.

In the light source device according to the aspect of the invention, when viewed from a direction parallel to a normal line of the one surface of the substrate, the reflecting surface may be disposed in a first area overlapping a second area of the wavelength conversion layer, the second area being irradiated with the excitation light.

According to the aspect of the invention with this configuration, the fluorescence, which has been excited by the excitation light and generated in the wavelength conversion layer, can totally be reflected by the total reflection surface with use efficiency.

A projector according to still another aspect of the invention includes the light source devices described above, a light modulation device adapted to modulate light from the light source device in accordance with image information, and a projection optical system adapted to project the modulated light from the light modulation device as a projection image.

According to this aspect of the invention, a projection image higher in quality can be projected.

BRIEF DESCRIPTION OF THE DRAWINGS

The invention will be described with reference to the accompanying drawings, wherein like numbers reference like elements.

FIGS. 2A and 2B are diagrams for explaining a rotary phosphor plate in the first embodiment, wherein FIG. 2A is a front view of the rotary phosphor plate, and FIG. 2B is an A1-A1 cross-sectional view of FIG. 2A.

FIGS. 6A and 6B are diagrams for explaining a rotary phosphor plate in the second embodiment, wherein FIG. 6A is a front view of the rotary phosphor plate, and FIG. 6B is a B2-B2 cross-sectional view of FIG. 6A.

DESCRIPTION OF EXEMPLARY EMBODIMENTS

Figure 1:
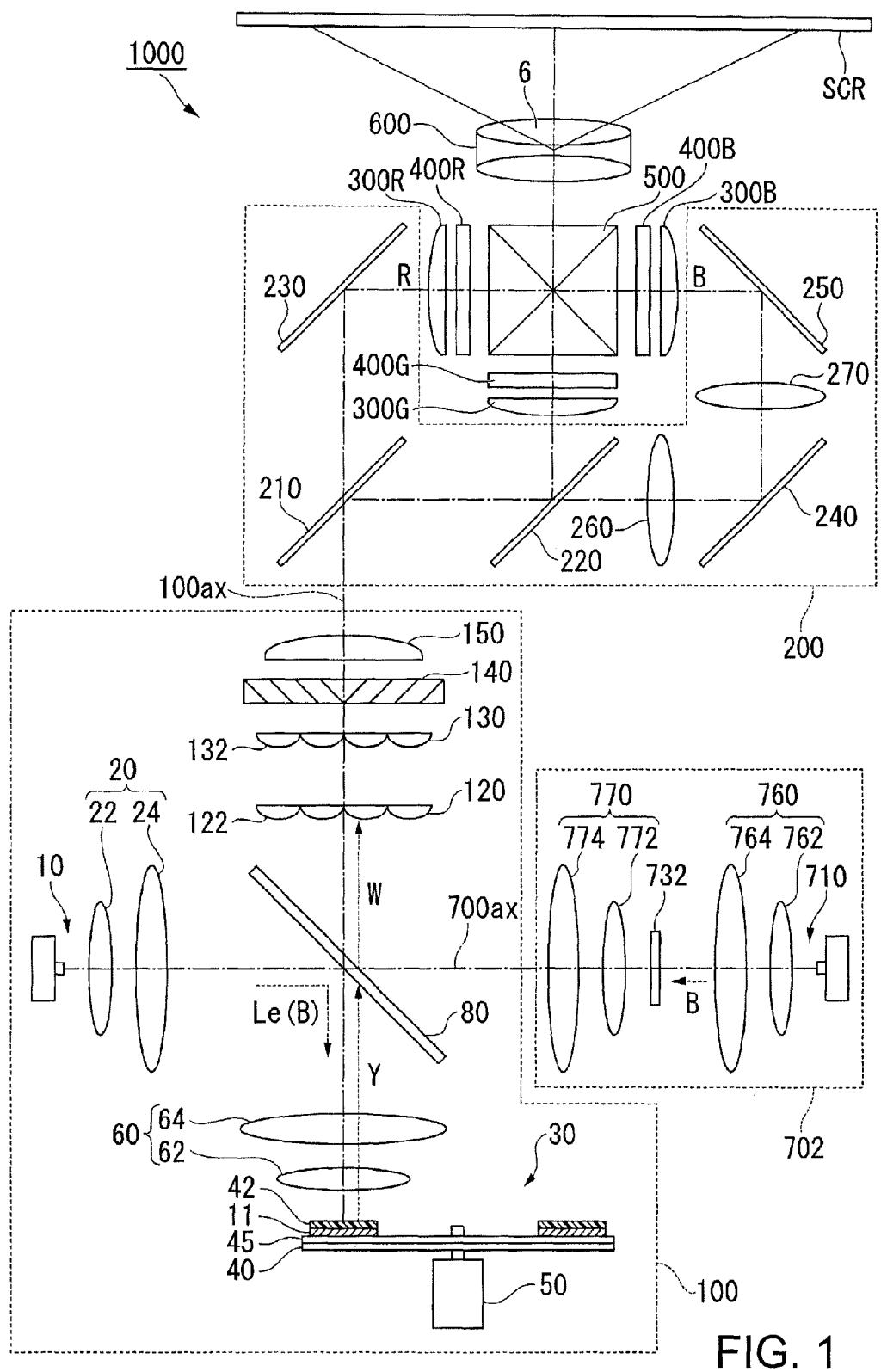
FIG. 1 is a plan view showing an optical system of a projector according to a first embodiment of the invention.

Hereinafter, an illumination device and a projector according to the invention will be explained based on some embodiments shown in the accompanying drawings. It should be noted that the scale size of each member is accordingly altered so that the member is shown large enough to be recognized in the drawings used in the following explanation.

Projector According to First Embodiment

Firstly, a configuration of the projector according to a first embodiment will be described.

FIG. 1 is a top view showing an optical system of the projector 1000 according to the first embodiment.

Figure 2A:
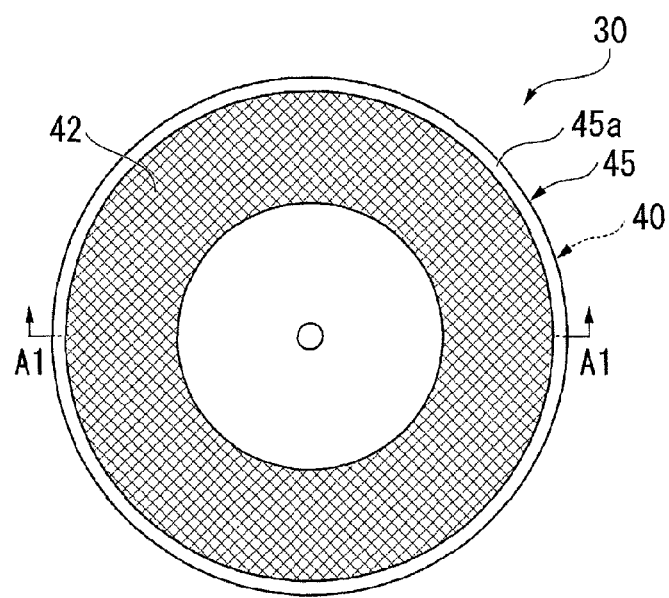
Figure 2B:
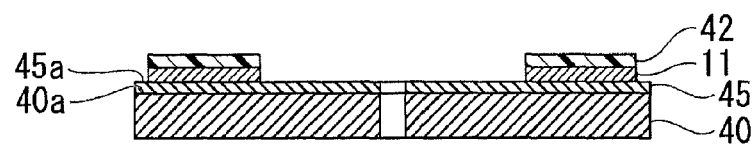
Figure 3:
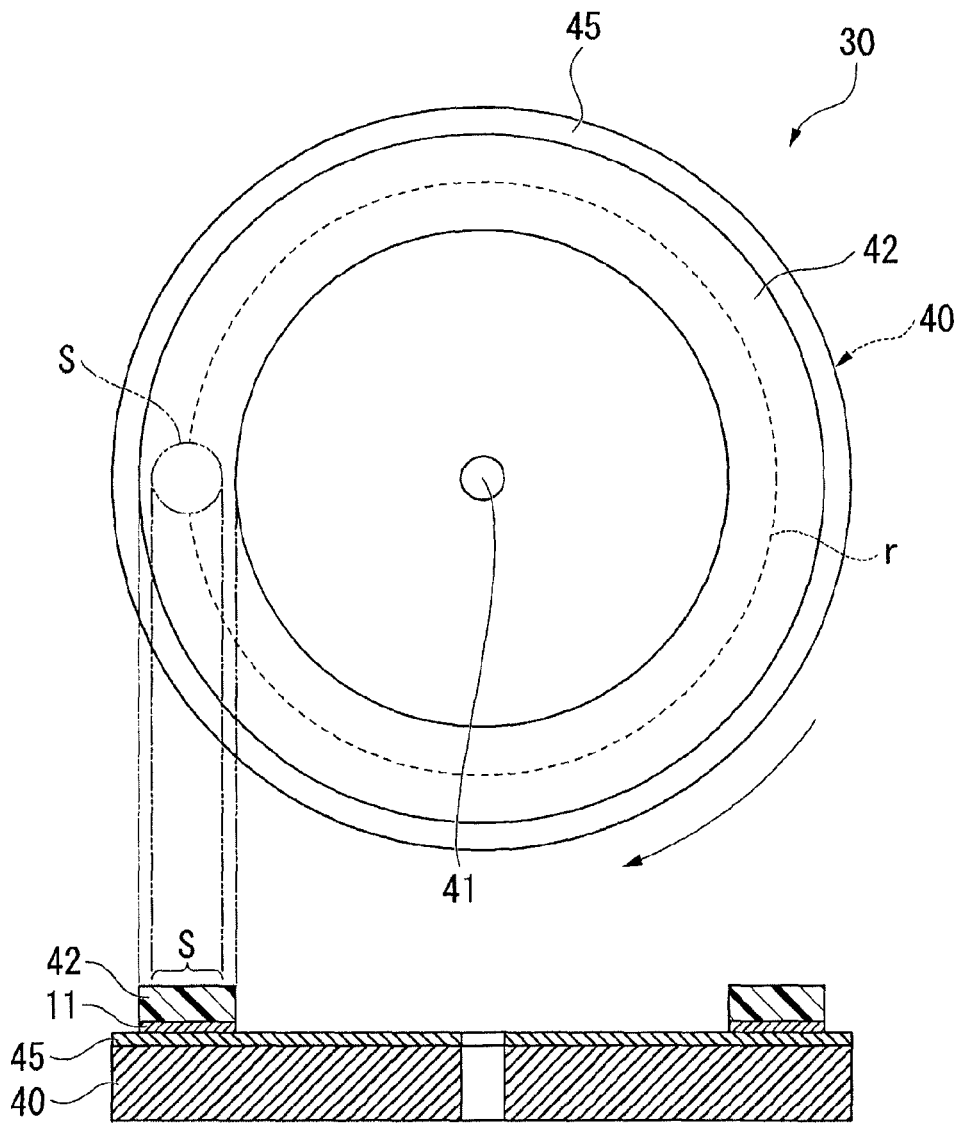
FIG. 3 corresponds to a plan view and a cross-sectional view showing a schematic configuration of the rotary phosphor plate in the first embodiment.
Figure 4A:
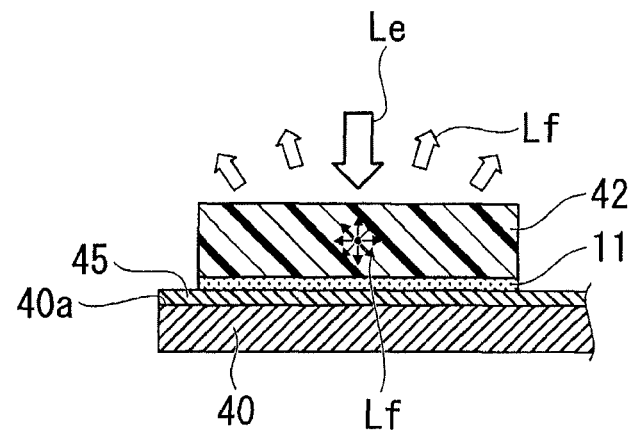
FIG. 4A is a diagram showing how the fluorescence is emitted in a phosphor layer.
Figure 4B:
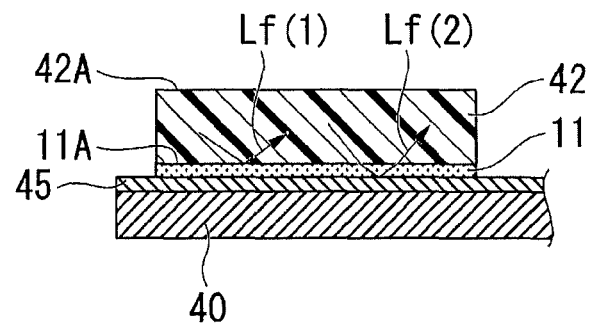
FIG. 4B is a diagram showing how the fluorescence is reflected by a bonding layer or a reflecting layer.

FIGS. 2A and 2B are diagrams for explaining the rotary phosphor plate 30 in the first embodiment. FIG. 2A is a front view of the rotary phosphor plate 30, and FIG. 2B is an A1-A1 cross-sectional view of FIG. 2A. FIG. 3 is a diagram showing the rotary phosphor plate 30 in the first embodiment. FIG. 4A is a diagram showing how the fluorescence is generated in a phosphor layer, and FIG. 4B is a diagram showing how the fluorescence is reflected by a bonding layer 11 or a reflecting layer (reflecting section) 45.

Firstly, the configuration of the projector 1000 according to the first embodiment will be explained.

As shown in FIG. 1, the projector 1000 is provided with a first illumination device 100, a color separation light guide optical system 200, liquid crystal light modulation devices 400R, 400G, and 400B, a cross dichroic prism 500, a projection optical system 600, and a second illumination device 702. The first illumination device 100 corresponds to a light source device according to the invention.

The first illumination device 100 is provided with a first solid-state light source device 10, a collimating light collection optical system 20, the rotary phosphor plate 30, an electric motor 50, a collimating light collection optical system 60, a first lens array 120, a second lens array 130, a polarization conversion element 140, and an overlapping lens 150. The first solid-state light source device 10 corresponds to a light emitting element according to the invention. The rotary phosphor plate 30 corresponds to the wavelength conversion element according to the invention.

The first solid-state light source device 10 is disposed so as to have an optical axis perpendicular to an illumination light axis 100ax. The first solid-state light source device 10 is formed of a laser source for emitting a blue light beam formed of a laser beam as an excitation light beam Le. Here, the blue light having a peak of the emission intensity at about 445 nm is emitted as the excitation light beam Le.

It should be noted that the first solid-state light source device 10 can be formed of a single laser source or a number of laser sources. Further, it is also possible to adopt a light source device for emitting a blue light beam having a wavelength (e.g., 460 nm) other than 445 nm.

The collimating light collection optical system 20 is provided with a first lens 22 and a second lens 24 and roughly collimates the light from the first solid-state light source device 10. The first lens 22 and the second lens 24 are each formed of a convex lens.

A dichroic mirror 80 is disposed in a light path from the collimating light collection optical system 20 to the collimating light collection optical system 60 so as to intersect with each of the optical axis of the first solid-state light source device 10 and the illumination light axis 100ax at an angle of 45°. The dichroic mirror 80 reflects blue light, and transmits red light and green light.

The collimating light collection optical system 60 has a function of making the excitation light beam Le from the dichroic mirror 80 enter the phosphor layer 42 in a roughly focused state, and a function of roughly collimating the fluorescence emitted from the rotary phosphor plate. The collimating light collection optical system 60 is provided with a first lens 62 and a second lens 64. The first lens 62 and the second lens 64 are each formed of a convex lens.

The rotary phosphor plate 30 emits a yellow light beam (the fluorescence) including red light and green light toward the same side as the side to which the blue light beam (the excitation light beam) is input. As shown in FIGS. 1, 2A, and 2B, the rotary phosphor layer 30 has a circular disk (a substrate) 40 which is rotatable by the electric motor 50. The circular disk 40 is made of a material transmitting the blue light beam. As the material of the circular disk 40, there can be used, for example, quartz glass, quartz crystal, sapphire, optical glass, and transparent resin.

It should be noted that in the present embodiment, it is also possible to use a circular disk made of an opaque material such as metal.

The reflecting layer 45, a bonding layer 11 corresponding to an intermediate layer according to the invention, and the phosphor layer 42 corresponding to the wavelength conversion layer according to the invention are stacked on a surface 40a of the circular disk 40 in this order.

The reflecting layer 45 is for reflecting visible light, and is formed so as to cover roughly the whole of the surface 40a of the circular disk 40. The reflecting layer 45 is formed of, for example, metal high in reflectance such as silver (Ag) or aluminum (Al).

The phosphor layer 42 is bonded to a surface 45a of the reflecting layer 45 via the bonding layer 11, and is disposed along a circumferential direction of the circular disk 40. A planar shape of the phosphor layer 42 viewed from a normal direction of the circular disk 40 is a ring-like shape concentric with the circular disk 40. In other words, the phosphor layer 42 is disposed around the rotational axis 41 of the circular disk 40 so as to have a belt-like shape.

In the present embodiment, the phosphor layer 42 is excited by the blue light beam having a wavelength of about 445 nm. The phosphor layer 42 converts the excitation light beam Le from the first solid-state light source device 10, namely the blue light beam B, into the yellow light beam Y including the red light R and the green light G.

The phosphor layer 42 includes materials different in refractive index from each other, and includes, for example, abase material and a plurality of phosphor particles although not shown in the drawings. As the base material of the phosphor layer 42, there can be cited, for example, alumina and glass. As the phosphor particles, there can be used $(Y,Gd)_3(Al,Ga)_5O_{12}$:Ce as a YAG phosphor.

As the phosphor layer 42, a sintered body obtained by mixing alumina as the base material and the YAG phosphor particles with each other can be used, and a material formed of glass or resin as the base material including the YAG phosphor particles, or the like can also be used. Here, the refractive index of alumina is 1.76, and the refractive index of glass is 1.5. Further, the refractive index of the YAG phosphor particles is 1.83.

It should be noted that it is also possible to use a sintered body formed only of the phosphor particles or the like as the phosphor layer 42.

The bonding layer 11 is disposed between the reflecting layer 45 and the phosphor layer 42, and is for bonding the whole of the phosphor layer 42 to the reflecting layer 45. The bonding layer 11 is formed of a material having refractive index lower than that of the phosphor layer 42 (the phosphor particles and the base material). As the material of the bonding layer 11, there can be cited silicone resin having refractive index of 1.41.

It is preferable for the bonding layer 11 to have a thickness, which is equal to or larger than the wavelength of the phosphor, and is preferably equal to or larger than 750 nm. In the present embodiment, the bonding layer 11 has the thickness equal to or larger than 1 μm.

The rotary phosphor plate 30 in the present embodiment is configured so that the excitation light beam Le from the first solid-state light source device 10 enters the phosphor layer 42 from the opposite side to the circular disk 40. The area where the phosphor layer 42 is disposed includes an area where the excitation light beam Le enters. Hereinafter, the area where the excitation light beam Le enters is referred to as an excitation light entrance area S (FIG. 3).

As shown in FIG. 3, in the present embodiment, by rotating the rotary phosphor plate 30 centered on the rotational shaft 41 of the electric motor 50, the excitation light entrance area S is made to be displaced on the rotary phosphor plate 30. Thus, the heat due to the excitation light beam Le can be prevented from being concentrated into one place.

As shown in FIG. 1, the collimating light collection optical system 60 is provided with a first lens 62 and a second lens 64, and roughly collimates the light from the rotary phosphor plate 30. The first lens 62 and the second lens 64 are each formed of a convex lens.

The first lens array 120 has a plurality of first small lenses 122 for dividing the light beam from the collimating light collection optical system 60 into a plurality of partial light beams. The plurality of first small lenses 122 is disposed in a matrix in a plane perpendicular to the illumination optical axis 100ax.

The second lens array 130 has a plurality of second small lenses 132 corresponding to the plurality of first small lenses 122 of the first lens array 120. The second lens array 130 images the image of each of the first small lenses 122 of the first lens array 120 in the vicinity of each of the image forming areas of the liquid crystal light modulation devices 400R, 400G, and 400B in cooperation with the overlapping lens 150. The plurality of second small lenses 132 is disposed in a matrix in a plane perpendicular to the illumination optical axis 100ax.

The polarization conversion element 140 converts each of the partial light beams divided by the first lens array 120 into a linearly polarized light beam.

The polarization conversion element 140 has a polarization split layer for transmitting one linearly polarized component out of the polarization components included in the light from the rotary phosphor plate 30 without modification while reflecting the other linearly polarized component in a direction perpendicular to the illumination light axis 100ax, a reflecting layer 45 for reflecting the other linearly polarized component, which has been reflected by the polarization split layer, in a direction parallel to the illumination light axis 100ax, and a wave plate for converting the other linearly polarized component having been reflected by the reflecting layer 45 into the one linearly polarized component.

The overlapping lens 150 collects each of the partial light beams from the polarization conversion element 140 to thereby make the partial light beams overlap the vicinity of the image forming areas of the liquid crystal light modulation devices 400R, 400G, and 400B. The first lens array 120, the second lens array 130, and the overlapping lens 150 constitute an integrator optical system for homogenizing the in-plane light intensity distribution of the light from the rotary phosphor plate 30.

The second illumination device 702 is provided with a second solid-state light source device 710, a light collection optical system 760, a scattering plate 732, and a collimating optical system 770.

The second solid-state light source device 710 is disposed across the illumination optical axis 100ax from the first solid-state light source device 10, and is disposed so that the optical axis 700ax is perpendicular to the illumination optical axis 100ax. The second solid-state light source 710 is a laser source for emitting the blue light B formed of a laser beam having a peak of the emission intensity at about 445 nm as a colored light beam.

The light collection optical system 760 is provided with a first lens 762 and a second lens 764. The light collection optical system 760 collects the blue light beam B from the second solid-state light source device 710 to the vicinity of the scattering plate 732. The first lens 762 and the second lens 764 are each formed of a convex lens.

The scattering plate 732 scatters the blue light beam from the second solid-state light source 710 to thereby form the blue light beam having a light distribution similar to that of the fluorescence emitted from the rotary phosphor plate 30. As the scattering plate 732, there can be used, for example, obscured glass made of optical glass.

The collimating optical system 770 is provided with a first lens 772 and a second lens 774 and roughly collimates the light from the scattering plate 732. The first lens 772 and the second lens 774 are each formed of a convex lens.

The projector 1000 according to the present embodiment is provided with a dichroic mirror 80 for combining the blue light beam B from the second illumination device 702 with the yellow light beam Y from the rotary phosphor plate 30 into a white light beam W.

The color separation light guide optical system 200 is provided with dichroic mirrors 210, 220, reflecting mirrors 230, 240, and 250, and relay lenses 260, 270. The color separation light guide optical system 200 separates the light from the first illumination device 100 into the red light, the green light, and the blue light beam, and guides the red light, the green light, and the blue light beam to the corresponding liquid crystal light modulation devices 400R, 400G, and 400B, respectively. The liquid crystal light modulation devices 400R, 400G, and 400B correspond to a light modulation device according to the invention.

Between the color separation light guide optical system 200 and the liquid crystal light modulation devices 400R, 400G, and 400B, there are disposed collecting lenses 300R, 300G, and 300B, respectively.

The dichroic mirror 210 is a dichroic mirror for transmitting the red light component and reflecting the green light component and the blue light component.

The dichroic mirror 220 is a dichroic mirror for reflecting the green light component and transmitting the blue light component.

The reflecting mirror 230 is a reflecting mirror for reflecting the red light component.

The reflecting mirrors 240, 250 are reflecting mirrors for reflecting the blue light component.

The red light having passed through the dichroic mirror 210 is reflected by the reflecting mirror 230, and then enters the image forming area of the liquid crystal light modulation device 400R for the red light after passing through the collecting lens 300R.

The green light having been reflected by the dichroic mirror 210 is further reflected by the dichroic mirror 220, and then enters the image forming area of the liquid crystal light modulation device 400G for the green light after passing through the collecting lens 300G.

The blue light beam having passed through the dichroic mirror 220 enters the image forming area of the liquid crystal light modulation device 400B for the blue light beam via the relay lens 260, the reflecting mirror 240 on the entrance side, the relay lens 270, the reflecting mirror 250 on the exit side, and the collecting lens 300B.

The liquid crystal light modulation devices 400R, 400G, and 400B are for modulating the respective colored light beams having input thereto in accordance with the image information to thereby form a color image. It should be noted that, although omitted from the drawings, the entrance side polarization plates are disposed between the collecting lenses 300R, 300G, and 300B and the liquid crystal light modulation devices 400R, 400G, and 400B, respectively, and the exit side polarization plates are disposed between the liquid crystal light modulation devices 400R, 400G, and 400B and the cross dichroic prism 500, respectively.

The cross dichroic prism 500 combines the image light beams emitted from the respective liquid crystal light modulation devices 400R, 400G, and 400B with each other to form the color image. The cross dichroic prism 500 has a roughly rectangular planar shape composed of four rectangular prisms bonded to each other, and on the roughly X-shaped interfaces on which the rectangular prisms are bonded to each other, there are formed dielectric multilayer films.

The color image emitted from the cross dichroic prism 500 is projected in an enlarged manner by the projection optical system 600 to form an image on a screen SCR.

The first illumination device 100 in the present embodiment is provided with the rotary phosphor plate 30 of a reflective type. The rotary phosphor plate 30 is formed by stacking the phosphor layer 42 on the reflecting layer 45, which is disposed on the surface 40a of the circular plate 40, via the bonding layer 11 as an intermediate layer according to the invention. Hereinafter, the interface between the phosphor layer 42 and the bonding layer 11 is referred to as a total reflection surface 11A. The total reflection surface 11A corresponds to a reflecting surface according to the invention. As shown in FIG. 4A, the fluorescence Lf generated inside the phosphor layer 42 is emitted in all directions inside the phosphor layer 42. As described above, the bonding layer 11 is formed of the material lower in refractive index than the material of the phosphor layer 42.

Therefore, as shown in FIG. 4B, fluorescence Lf(1) out of the fluorescence Lf having been generated inside the phosphor layer 42 enters the interface between the phosphor layer 42 and the bonding layer 11 at an angle equal to or larger than a critical angle, and is then totally reflected by the interface.

Further, a part Lf (2) of fluorescence having entered the total reflection surface 11A at an angle smaller than the critical angle out of the fluorescence Lf having been generated inside the phosphor layer 42 is transmitted through the total reflection surface 11A, and another part thereof is reflected by the total reflection surface 11A. The component (Lf(2)) having been transmitted through the total reflection surface 11A is reflected by the reflecting layer 45.

In the case in which the reflecting layer 45 is a metal reflecting film, a part of the light is absorbed when reflected. In contrast, in the present embodiment, since the bonding layer 11 lower in refractive index than the phosphor layer 42 is disposed between the reflecting layer 45 and the phosphor layer 42, a part of the light beam having entered the total reflection surface 11A from the phosphor layer 42 is totally reflected by the total reflection surface 11A. Therefore, only a partial component out of the fluorescence emitted inside the phosphor layer 42 toward the reflecting layer 45 can enter the reflecting layer 45. Further, in the total reflection surface 11A, light loss does not occur. Therefore, compared to the case in which the bonding layer 11 according to the invention is not disposed, the light absorption due to the reflecting layer 45 is low, and the use efficiency of the fluorescence in the rotary phosphor plate 30 is high.

Thus, the projector 1000 provided with the first illumination device 100 higher in luminance can be obtained.

Although in the present embodiment, the bonding layer 11 is disposed in the entire area overlapping the phosphor layer 42 viewed from the normal direction of the circular disk 40, it is also possible for the bonding layer 11 to be disposed at least in an area overlapping an incident area S where the phosphor layer 42 is irradiated with the excitation light. It is sufficient to adopt a configuration in which a large proportion of the light generated by the excitation light with which the phosphor layer 42 is irradiated can be totally reflected by the total reflection surface 11A.

Further, since in the present embodiment, the bonding layer 11 has a thickness equal to or larger than the wavelength of the fluorescence, a good total reflection state in the total reflection surface 11A can be obtained.

Projector According to Second Embodiment

Then, a configuration of a projector according to a second embodiment of the invention will be explained.

Figure 5:
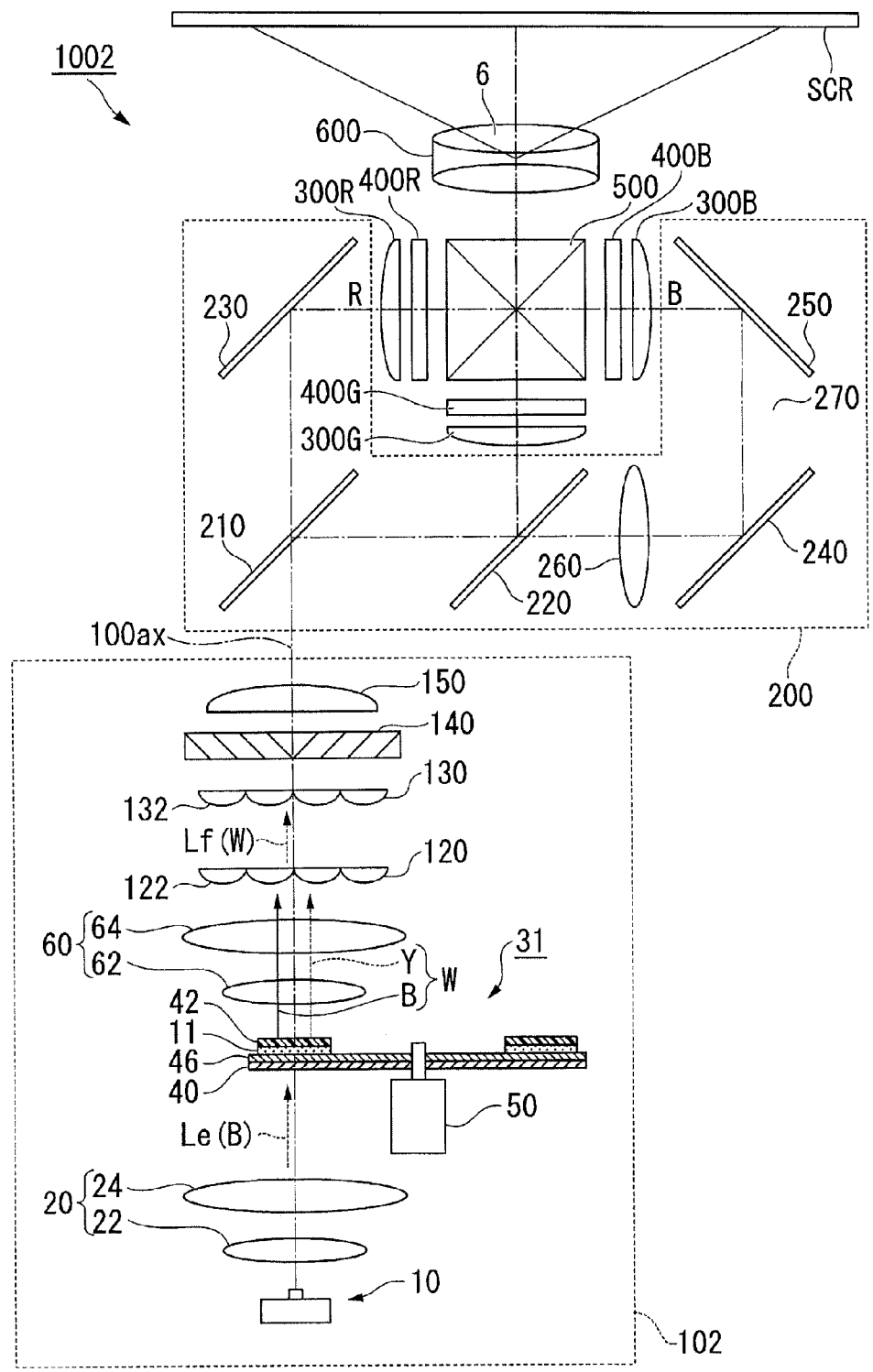
FIG. 5 is a top view showing an optical system of a projector according to a second embodiment of the invention.

FIG. 5 is a top view showing an optical system of the projector 1002 according to the second embodiment.

Figure 6A:
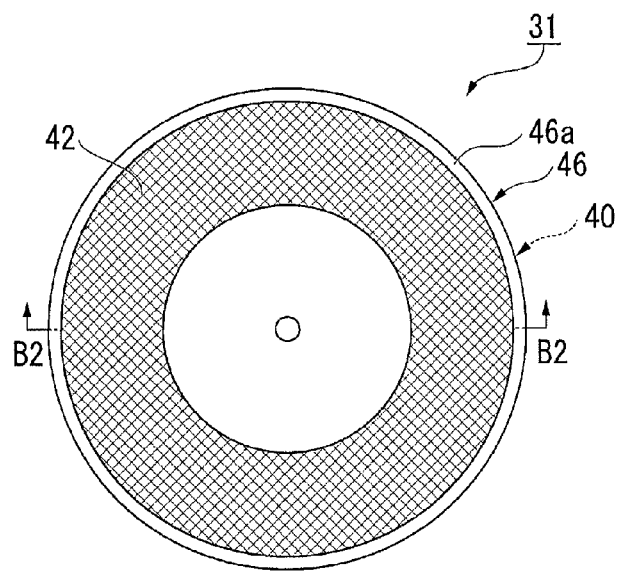
Figure 6B:
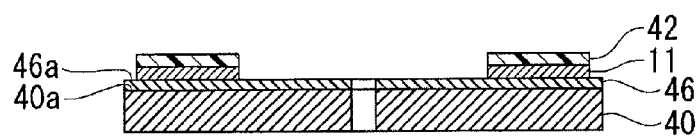
Figure 7A:
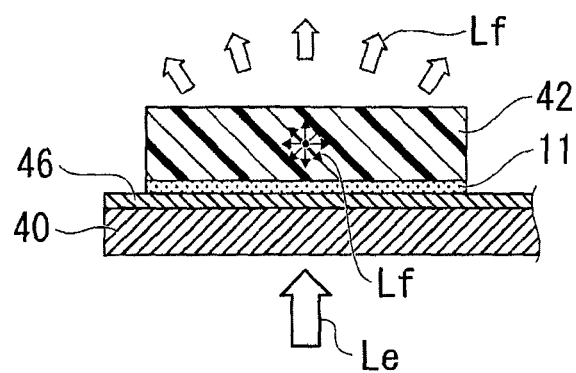
FIG. 7A is a diagram showing how the fluorescence is emitted in a phosphor layer.
Figure 7B:
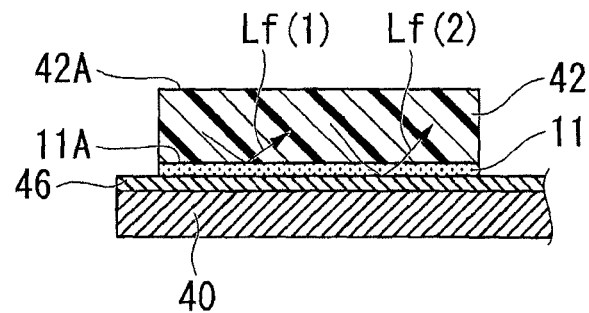
FIG. 7B is a diagram showing how the fluorescence is reflected by a bonding layer or a reflecting layer.

FIGS. 6A and 6B are diagrams for explaining a rotary phosphor plate in the second embodiment, wherein FIG. 6A is a front view of the rotary phosphor plate 30, and FIG. 6B is a B2-B2 cross-sectional view of FIG. 6A. FIG. 7A is a diagram showing how the fluorescence is generated in a phosphor layer, and FIG. 7B is a diagram showing how the fluorescence is reflected by a bonding layer 11 or a dichroic mirror 46.

A configuration of the projector 1002 according to the second embodiment will be explained.

The projector 1002 is different from the embodiment described above in the point that a rotary phosphor plate 31 of a transmissive type is provided. Therefore, in the following explanation, a part different from the embodiment described above will be explained in detail, and the explanation of substantially the same configuration will be omitted. The rotary phosphor plate 31 corresponds to the wavelength conversion element according to the invention.

As shown in FIG. 5, the projector 1002 is provided with an illumination device 102 corresponding to the light source device according to the invention, the color separation light guide optical system 200, the liquid crystal light modulation devices 400R, 400G, and 400B, the cross dichroic prism 500, and the projection optical system 600.

The illumination device 102 is provided with the solid-state light source device 10 corresponding to the light emitting element according to the invention, the collimating light collection optical system 20, the rotary phosphor plate 31, the electric motor 50, the collimating light collection optical system 60, the first lens array 120, the second lens array 130, the polarization conversion element 140, and the overlapping lens 150. The collimating light collection optical system 20, the collimating light collection optical system 60, the first lens array 120, the second lens array 130, the polarization conversion element 140, and the overlapping lens 150 are disposed so that the respective optical axes roughly coincide with the optical axis of the solid-state light source device 10.

As shown in FIG. 6B, in the rotary phosphor plate 31, a dichroic mirror 46 corresponding to the reflecting section according to the invention, the bonding layer 11, and the phosphor layer 42 are stacked on the surface 40a of the circular disk 40, which is rotatable by the electric motor 50, in this order. It is arranged that the excitation light beam from the solid-state light source device 10 enters the phosphor layer 42 from the circular disk 40 side.

The bonding layer 11 has the refractive index lower than the refractive index of the phosphor layer 42.

The dichroic mirror 46 is for transmitting the excitation light beam while reflecting the fluorescence. The dichroic mirror 46 is formed of a dielectric multilayer film, and is formed so as to cover roughly the whole of the surface 40a of the circular disk 40. The excitation light having been transmitted through the dichroic mirror 46 enters the phosphor layer 42 after having been transmitted through the bonding layer 11.

The phosphor layer 42 is made of a similar material to that of the embodiment described above, and as shown in FIGS. 6A and 6B, is bonded to a surface 46a of the dichroic mirror 46 via the bonding layer 11.

The phosphor layer 42 converts the excitation light beam Le from the solid-state light source device 10 shown in FIG.

5, namely the blue light beam B, into the yellow light beam Y including the red light R and the green light G, and at the same time transmits the rest part of the excitation light beam Le without performing the conversion thereon. The white light beam W obtained by combining the yellow light beam Y and the blue light beam B with each other is emitted from the phosphor layer 42.

As shown in FIG. 7A, the fluorescence Lf generated in the phosphor layer 42 is emitted in all directions inside the phosphor layer 42.

As described above, the refractive index of the bonding layer 11 is lower than the refractive index of the phosphor layer 42. Therefore, the total reflection surface 11A as an interface between the bonding layer 11 and the phosphor layer 42 reflects a part of the light beam from the phosphor layer 42, and at the same time transmits the rest of the light beam toward the dichroic mirror 46.

Therefore, as shown in FIG. 7B, the fluorescence Lf(1) out of the fluorescence Lf having been generated inside the phosphor layer 42 enters the total reflection surface 11A at an angle equal to or larger than the critical angle, and is then totally reflected by the total reflection surface 11A. Further, a part of the fluorescence Lf(2) having entered the total reflection surface 11A at an angle smaller than the critical angle out of the fluorescence Lf having been generated inside the phosphor layer 42 is transmitted through the total reflection surface 11A to enter the bonding layer 11, and is then reflected by the dichroic mirror 46. Another part of the fluorescence Lf(2) is reflected by the total reflection surface 11A.

In general, the reflection characteristics of the dichroic mirror depend on an incident angle and a wavelength of the light input thereto. Therefore, the reflection by the dichroic mirror is accompanied by a loss. However, since in the present embodiment, only a partial component of the fluorescence having been emitted inside the phosphor layer 42 toward the dichroic mirror 46 enters the dichroic mirror 46, the light loss due to the dichroic mirror 46 is low and the use efficiency of the fluorescence in the rotary phosphor plate 31 is high compared to the case in which the bonding layer 11 according to the invention is not disposed.

As described above, even in the case of the rotary phosphor plate 31 of the transmissive type, the projector 1002 high in use efficiency of the fluorescence and higher in luminance is obtained.

Rotary Phosphor Plate According to Second Embodiment

Then, a configuration of a rotary phosphor plate according to the second embodiment will be described.

Figure 8:
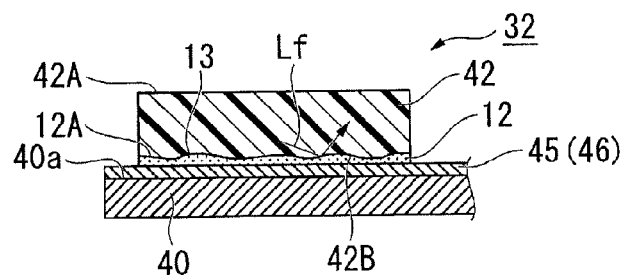
FIG. 8 is a cross-sectional view partially showing a configuration of the rotary phosphor plate according to the second embodiment in an enlarged manner.

FIG. 8 is a cross-sectional view partially showing the configuration of the rotary phosphor plate according to the second embodiment in an enlarged manner.

The rotary phosphor plate 32 according to the second embodiment corresponds to the wavelength conversion element according to the invention, and as shown in FIG. 8, the reflecting layer 45, a bonding layer 12, and the phosphor layer 42 are stacked on the surface 40a of the circular disk 40 in this order. In the present embodiment, an uneven shape 13 is disposed in the interface between the phosphor layer 42 and the bonding layer 12 having the refractive index lower than the refractive index of the phosphor layer 42.

Specifically, when forming the phosphor layer 42, by roughening a surface 42B on the opposite side to the light exit surface 42A, the fine uneven shape 13 can be formed in the interface with the bonding layer 12. Due to such an uneven shape 13, it is possible to provide a scattering property to a total reflection surface 12A that reflects the light from the phosphor layer 42.

As a method of providing the uneven shape 13 to the total reflection surface 12A, it is possible to form the uneven shape 13 by planarizing the surface 42B with low flatness, or by performing a process of roughening the surface 42B. The uneven shape 13 can be a random shape, or can also be a periodical shape. It should be noted that an average surface roughness of the total reflection surface 12A is assumed to be of a degree with which the phosphor layer 42 can be formed on the bonding layer 12 in a good condition.

As the material of the bonding layer 12, there can be cited silicone resin with the refractive index (the second refractive index) of 1.41 similarly to the case of the bonding layer 11 in the embodiments described above.

According to the present embodiment, when the fluorescence Lf is totally reflected by the total reflection surface 12A, the total reflection occurs in directions different from each other due to the fine uneven shape 13. In other words, by scattering the reflected light from the total reflection surface 12A using the fine uneven shape 13 (a scattering structure) provided to the total reflection surface 12A, the incident angle of the light with respect to the light exit surface 42A of the phosphor layer 42 can be varied. As described above, even in the case in which the light scattering inside the phosphor layer 42 is low, or the case in which the light scattering hardly occur, by disposing the scattering structure in the interface between the phosphor layer 42 and the bonding layer 12, the component emitted from the light exit surface 42A side of the phosphor layer 42 can be increased.

In contrast, in the case in which the total reflection surface 12A is not provided with the scattering structure, since the refractive index of the bonding layer 12 is higher than 1, the light having totally been reflected by the total reflection surface 12A is totally reflected by the interface between the light exit surface 42A and air. In other words, the light having totally been reflected by the total reflection surface 12A enters the total reflection surface 12A and the light exit surface 42A at respective angles equal to or larger than the critical angle, and is therefore not emitted to the outside from the phosphor layer 42.

Therefore, in the present embodiment, the fine uneven shape 13 is provided to the total reflection surface 12A so that the reflected light reflected by the total reflection surface 12A is scattered. Thus, since a large proportion of the reflected light totally reflected by the total reflection surface 12A enters the light exit surface 42A at an angle smaller than the critical angle, it is possible to emit a larger amount of light from the light exit surface 42A.

According to this configuration, the use efficiency of the fluorescence can further be improved.

Rotary Phosphor Plate According to Third Embodiment

Then, a configuration of a rotary phosphor plate according to a third embodiment will be described.

Figure 9:
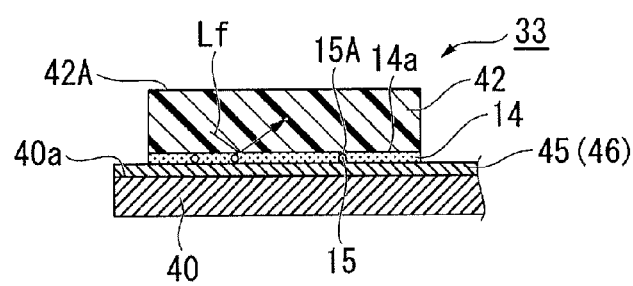
FIG. 9 is a cross-sectional view partially showing a configuration of a rotary phosphor plate according to a third embodiment of the invention in an enlarged manner.

FIG. 9 is a cross-sectional view partially showing the configuration of the rotary phosphor plate according to the third embodiment in an enlarged manner.

As shown in FIG. 9, in the rotary phosphor plate 33 according to the third embodiment, the reflecting layer 45, a bonding layer 14, and the phosphor layer 42 are stacked on the surface 40a of the circular disk 40 in this order. The bonding layer (the intermediate layer) 14 of the present embodiment has an adhesive 14a, and a plurality of voids 15 included in the adhesive 14a. The voids 15 are not required to be entirely surrounded by the adhesive 14a.

As the material of the bonding layer 14, a material having the same refractive index as the refractive index of the phosphor layer 42 is used, for example. The refractive index of the void 15 as an air bubble is 1.0, and is lower than the refractive index of the base material and the phosphor particles as the materials constituting the phosphor layer 42. Therefore, the interface between the void 15 and the material in the periphery of the void 15 functions as a total reflection surface 15A.

According to the present embodiment, the fluorescence Lf having entered the total reflection surface 15A at an angle equal to or larger than the critical angle out of the fluorescence having been generated in the phosphor layer 42 is totally reflected by the total reflection surface 15A. The total reflection surface 15A forms a curved surface. Therefore, the direction in which the light is totally reflected differs by the incident position of the fluorescence Lf on the total reflection surface 15A. Therefore, the light reflected by the total reflection surface 15A is the scattered light.

In contrast, it results that the fluorescence having entered the area other than the voids 15 out of the bonding layer 14 is transmitted through the bonding layer 14, and is then reflected by the reflecting layer 45. In order to suppress the light absorption in the reflecting layer 45, it is necessary to totally reflect as much fluorescence as possible by the voids 15 of the bonding layer 14, namely the total reflection surfaces 15A, to reduce an amount of the light entering the reflecting layer 45.

In the present embodiment, by controlling the size and the number of the voids 15, the component reflected by the total reflection surfaces 15A can be increased, and thus, the light to be reflected by the reflecting layer 45 can be decreased.

Further, as the material of the bonding layer 14, a material having the refractive index lower than the refractive index of the phosphor layer 42 can be used. For example, similarly to the embodiments described above, in the case of forming the bonding layer 14 using the silicone resin having the refractive index of 1.41, it results that the interface between the bonding layer 14 and the phosphor layer 42 functions as a total reflection surface 14A.

The fluorescence having entered the interface between the phosphor layer 42 and the bonding layer 14 at an angle equal to or larger than the critical angle is totally reflected by the interface. Apart of the fluorescence having entered the interface at an angle smaller than the critical angle is transmitted through the interface. The light having entered the interface between the bonding layer 14 and the void 15 at an angle equal to or larger than the critical angle is totally reflected by the interface.

Therefore, the light entering the reflecting layer 45 can be reduced, and it is possible to further suppress the light absorption in the reflecting layer 45.

The voids 15 can be formed by generating or mixing the voids in the bonding layer 14 in the manufacturing process of the rotary phosphor plate 32.

It should be noted that although in the present embodiment, the configuration in which the plurality of voids is included in the bonding layer 14 is cited as an example, the configuration is not limited thereto, but it is possible to cite a configuration in which, for example, a plurality of voids is included in the phosphor layer 42.

Rotary Phosphor Plate According to Fourth Embodiment

Then, a configuration of a rotary phosphor plate according to a fourth embodiment will be described.

Figure 10:
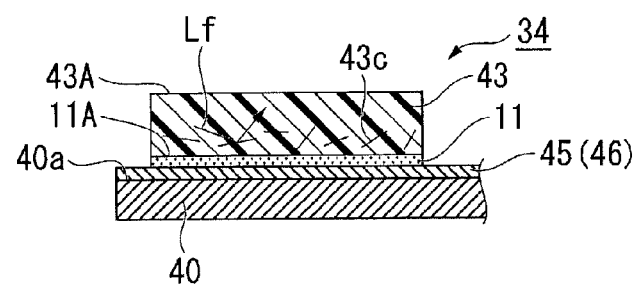
FIG. 10 is a cross-sectional view partially showing a configuration of a rotary phosphor plate according to a fourth embodiment of the invention in an enlarged manner.

FIG. 10 is a cross-sectional view partially showing the configuration of the rotary phosphor plate according to the fourth embodiment in an enlarged manner.

The rotary phosphor plate 34 according to the fourth embodiment corresponds to the wavelength conversion element according to the invention. As shown in FIG. 10, the reflecting layer 45, the bonding layer 11, and a phosphor layer 43 are stacked on the surface 40*a* of the circular disk 40 in this order. In the wavelength conversion element according to the present embodiment, crystal faults or crystal grain boundaries provided to the phosphor layer 43 correspond to a plurality of total reflection surfaces 43*c*. The proportion of the crystal faults or the crystal grain boundaries can be controlled by manufacturing conditions when forming the phosphor layer 43.

The bonding layer 11 is similar to that of the embodiments described above, and the interface between the phosphor layer 43 and the bonding layer 11 forms the total reflection surface 11A.

According to the present embodiment, the fluorescence having entered the total reflection surface 43*c* at an angle equal to or larger than the critical angle is totally reflected by the total reflection surface 43*c*. A part of the fluorescence having entered the total reflection surface 43*c* at an angle smaller than the critical angle is transmitted through the total reflection surface 43*c*, and then enters the total reflection surface 11A.

Although the light having entered the total reflection surface 11A at the incident angle equal to or larger than the critical angle is totally reflected by the total reflection surface 11A, apart of the light having entered there at the incident angle smaller than the critical angle is reflected by the reflecting layer 45 after transmitted through the total reflection surface 11A.

In the present embodiment, not only the interface between the bonding layer 11 and the phosphor layer 43 but also the phosphor layer 43 itself has the function of totally reflecting the fluorescence. As described above, the phosphor layer 43 has the plurality of total reflection surfaces 43*c* each formed of the crystal fault or the crystal grain boundary. The total reflection surfaces 43*c* randomly exist in the phosphor layer 43, and at the same time, face to a variety of directions. Therefore, it is possible for the total reflection surfaces 43*c* to totally reflect the light, which does not proceed toward the light exit surface 43A of the phosphor layer 43 or the bonding layer 11, toward the light exit surface 43A or the bonding layer 11. Thus, the light extraction use efficiency in the phosphor layer 43 can be improved.

Further, by making the total reflection surface 43*c* totally reflect the fluorescence Lf, the fluorescence entering the total reflection surface 11A decreases. Therefore, the light that passes through the total reflection surface 11A to enter the reflecting layer 45 is reduced compared to the embodiments described above, and only little light is absorbed by the reflecting layer 45.

As described above, by totally reflecting a certain amount of fluorescence by the total reflection surfaces 43*c* in the phosphor layer 43 in advance in addition to the total reflection by the total reflection surface 11A of the bonding layer 11, an amount of light entering the reflecting layer 45 decreases, and thus, it is possible to suppress the light absorption in the reflecting layer 45.

Thus, the use efficiency of the fluorescence is further improved, and the illumination light high in luminance can be obtained.

It should be noted that since in the present embodiment, the phosphor layer 43 is provided with the total reflection surface 43*c*, it is not necessarily required for the refractive index of the bonding layer 11 to be lower than the refractive index of the phosphor layer 43. However, in order to improve the use efficiency of the fluorescence, it is preferable for the refractive index of the bonding layer 11 to be lower than the refractive index of the phosphor layer 43.

Rotary Phosphor Plate According to Fifth Embodiment

Then, a configuration of a rotary phosphor plate according to a fifth embodiment will be described.

Figure 11:
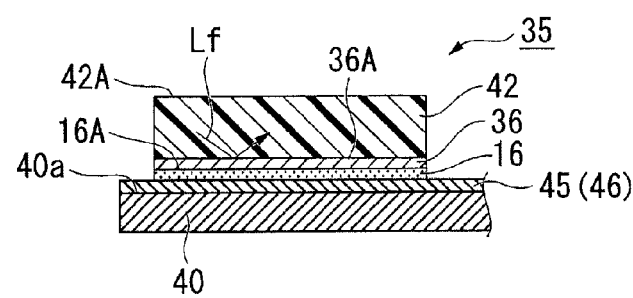
FIG. 11 is a cross-sectional view partially showing a configuration of a rotary phosphor plate according to a fifth embodiment of the invention in an enlarged manner.

FIG. 11 is a cross-sectional view partially showing the configuration of the rotary phosphor plate according to the fifth embodiment in an enlarged manner.

The rotary phosphor plate 35 according to the fifth embodiment corresponds to the wavelength conversion element according to the invention, and as shown in FIG. 11, the reflecting layer 45, a bonding layer 16, a low refractive index layer 36, and the phosphor layer 43 are stacked on the surface 40a of the circular disk 40 in this order.

The low refractive index layer 36 has the refractive index lower than the refractive index of the phosphor layer 43. Thus, the interface between the low refractive index layer 36 and the phosphor layer 43 functions as a total reflection surface 36A.

By using a material having higher thermal conductivity than that of the phosphor layer 43 as a material of the bonding layer 16, the heat radiation performance of the bonding layer 16 is improved, and thus, rise in temperature of the phosphor layer 43 can be suppressed. As the material of the bonding member 16, there can be cited, for example, a silver paste.

In the case in which the refractive index of the bonding layer 16 is equal to or higher than the refractive index of the low refractive index layer 36, it results that the light not having totally been reflected by, but having been transmitted through, the total reflection surface 36A is also transmitted through the interface between the low refractive index layer 36 and the bonding layer 16, and is then reflected by the reflecting layer 45.

In contrast, in the case in which the refractive index of the bonding layer 16 is lower than the refractive index of the low refractive index layer 36, it results that the interface between the bonding layer 16 and the low refractive index layer 36 functions as the total reflection surface 16A. The total reflection surface 16A totally reflects the light having entered the total reflection surface 16A at the incident angle equal to or larger than the critical angle out of the light having been transmitted through the total reflection surface 36A. As described above, the light is totally reflected not only by the total reflection surface 36A, but also by the total reflection surface 16A. Therefore, an amount of the light entering the reflecting layer 45 is smaller than in the case in which the refractive index of the bonding layer 16 is equal to or higher than the refractive index of the low refractive index layer 36, and thus, the use efficiency of the fluorescence is further improved, and the illumination light high in luminance can be obtained.

It should be noted that although in the description of the rotary phosphor plate according to any one of the second through fifth embodiments shown in FIGS. 8 through 11, the configuration of the reflective rotary phosphor plate is described, it is also possible to provide the transmissive rotary phosphor plate by using the dichroic mirror 46 instead of the reflecting layer 45.

Although the explanation is hereinabove presented regarding the preferable embodiments of the invention with reference to the accompanying drawings, the invention is not limited to such examples as described above, and those skilled in the art can perceive various modified examples or corrected examples within the scope or the spirit of the technical concepts set forth in the appended claims, which examples should accordingly be understood as being within the scope of the invention. It is also possible to arbitrarily combine any of the configurations of the embodiments within the scope of the present invention.

For example, it is possible to combine any of the configurations of the first through fifth embodiments with each other, or it is possible to combine all of the configurations.

Although in each of the embodiments described above, the reflecting layer is disposed between the phosphor layer and the circular disk, the invention is not limited to this configuration. For example, in the case in which the circular disk is made of a material reflecting the visible light, the reflecting layer can be eliminated. In this case, the light reflective circular disk corresponds to the reflecting layer according to the invention.

Further, although in each of the embodiments described above, the light source device and the second light source device each formed of the laser source are used, the invention is not limited to this configuration. For example, the light source device and the second light sources device each formed of a light emitting diode can also be used.

Further, a digital micromirror device can also be used as the light modulation device.

Further, although in each of the embodiments, the example of applying the illumination device according to the invention to the projector is explained, the invention is not limited to this example. For example, the illumination device according to the invention can also be applied to other optical equipment (e.g., a head lamp of a vehicle, or an illumination device).

The entire disclosure of Japanese Patent Application No. 2014-196411, filed on Sep. 26, 2014 is expressly incorporated by reference herein.

What is claimed is:

1. A wavelength conversion element comprising:
a substrate;
a reflecting section disposed on the substrate;
an intermediate layer disposed on the reflecting section;
a reflecting surface disposed on the intermediate layer; and
a wavelength conversion layer disposed on the reflecting surface, and emitting fluorescence in response to irradiation with excitation light,
wherein the reflecting surface is adapted to totally reflect light having been input at an angle no smaller than a critical angle out of the fluorescence, and
wherein the intermediate layer has a refractive index lower than a refractive index of the wavelength conversion layer.

2. The wavelength conversion element according to claim 1, wherein
the intermediate layer has a thickness no smaller than a wavelength of the fluorescence.

3. The wavelength conversion element according to claim 2, wherein
the thickness of the intermediate layer is no smaller than 1 µm.

4. The wavelength conversion element according to claim 1, wherein
the intermediate layer is formed of an adhesive.

5. The wavelength conversion element according to claim 1, wherein
thermal conductivity of the intermediate layer is higher than thermal conductivity of the wavelength conversion layer.

6. The wavelength conversion element according to claim 1, wherein
the reflecting surface has an uneven shape.

7. The wavelength conversion element according to claim 1, wherein
the reflecting surface is an interface between a void and a material located in a periphery of the void.

8. The wavelength conversion element according to claim 1, wherein
the wavelength conversion layer includes one of a plurality of crystal faults and a plurality of crystal grain boundaries, and
the reflecting surface is formed of one of the crystal fault and the crystal grain boundary.

9. The wavelength conversion element according to claim 1, wherein
the reflecting section is a dichroic mirror adapted to transmit the excitation light and reflect the fluorescence.

10. The wavelength conversion element according to claim 1, wherein
the wavelength conversion layer includes a plurality of materials different in refractive index from each other.

11. The wavelength conversion element according to claim 1, wherein
the substrate is rotatable around a rotational axis intersecting with the one surface of the substrate.

12. A light source device comprising:
a light emitting element adapted to emit excitation light; and
the wavelength conversion element according to claim 1.

13. The light source device according to claim 12, wherein
when viewed from a direction parallel to a normal line of the one surface of the substrate, the reflecting surface of the wavelength conversion element is disposed in a first area overlapping a second area of the wavelength conversion layer, the second area being irradiated with the excitation light.

14. A projector comprising:
the light source device according to claim 12;
a light modulation device adapted to modulate light from the light source device in accordance with image information; and
a projection optical system adapted to project the modulated light from the light modulation device as a projection image.

15. A projector comprising:
the light source device according to claim 13;
a light modulation device adapted to modulate light from the light source device in accordance with image information; and
a projection optical system adapted to project the modulated light from the light modulation device as a projection image.

* * * * *